United States Patent [19]

Froidevaux et al.

[11] Patent Number: 5,271,728
[45] Date of Patent: Dec. 21, 1993

[54] APPARATUS WITH DETACHABLE TEETH FOR PRESSING OUT RAW MATERIALS

[75] Inventors: Pierre-Alain Froidevaux, Wittenbach; Werner Haelg, Oberuzwil, both of Switzerland

[73] Assignee: Bühler AG, Uzwil, Switzerland

[21] Appl. No.: 601,946

[22] Filed: Oct. 22, 1990

[30] Foreign Application Priority Data

Nov. 21, 1989 [CH] Switzerland ............... 04172/89

[51] Int. Cl.⁵ .................................................. B29C 47/00
[52] U.S. Cl. .................................. 425/289; 264/142; 264/167; 264/177.1; 425/204; 425/308; 425/464; 426/516
[58] Field of Search .................... 264/142, 167, 177.1, 264/177.13; 425/238, 289, 296, 297, 305.1, 308, 311, 382 N, 204, 461, 464; 426/489, 516

[56] References Cited

U.S. PATENT DOCUMENTS

| | | | |
|---|---|---|---|
| 2,489,951 | 11/1949 | Bump | 425/461 |
| 3,252,181 | 5/1966 | Hureau | 264/167 |
| 3,333,039 | 7/1967 | Hureau | 264/167 |
| 3,384,692 | 5/1968 | Galt et al. | 264/167 |
| 3,473,986 | 10/1969 | Hureau | 264/167 |
| 3,587,281 | 6/1971 | Lemelson | 264/167 |
| 3,700,521 | 10/1972 | Gaffney | 264/167 |
| 3,746,485 | 7/1973 | Schrenk | 264/167 |
| 3,932,092 | 1/1976 | Hureau et al. | 264/167 |
| 3,944,641 | 3/1976 | Lemelson | 264/167 |
| 3,994,658 | 11/1976 | McCarthy et al. | 425/464 |
| 4,001,452 | 1/1977 | Williams | |
| 4,794,011 | 12/1988 | Schumacher | 426/489 |

FOREIGN PATENT DOCUMENTS

| | | | |
|---|---|---|---|
| 51-46528 | 12/1976 | Japan | 264/177.1 |
| 482034 | 1/1970 | Switzerland | 264/177.13 |
| 2053788 | 7/1989 | United Kingdom | |

Primary Examiner—David A. Simmons
Assistant Examiner—William J. Matney, Jr.
Attorney, Agent, or Firm—Martin A. Farber

[57] ABSTRACT

An apparatus for forming shaped material from a raw material employs a substantially cylindrical housing 3 with a screw shaft 2 arranged in it. A frontal end surface of the housing, located at the downstream end is closed by a counter-pressure member 9 which, together with the housing 3, limits a discharge opening. The counter-pressure member is held against conveyed material by a force of predetermined magnitude acting opposite the conveying direction. Surprisingly, this results in a high compactness and a good stability of shape of the shaped material, and also facilitates a starting of such an apparatus. Removable teeth define an orifice.

43 Claims, 3 Drawing Sheets

APPARATUS WITH DETACHABLE TEETH FOR PRESSING OUT RAW MATERIALS

FIELD OF THE INVENTION

The invention relates to an apparatus pressing out raw material comprising a substantially cylindrical housing with at least one screw shaft arranged in it. The frontal end surface of this housing is closed by a counter-pressure member limiting a discharge opening together with the housing. This discharge opening is divided in circumferential direction into a plurality of discharge channels by intermeshing teeth mounted on the frontal end surface and the counter-pressure member.

BACKGROUND OF THE INVENTION

Such an apparatus is known from the U.S. Pat. No. 4,794,011. In that procedure the raw material is pressed out between the teeth and is then exposed to atmospheric pressure to achieve an expanding effect. As specified therein in an example, the final product will leave such an apparatus in a "slightly crumbly" shape. When shaped material was to be manufactured, the procedure according to U.S. Pat. No. 4,001,452 had to be applied, in which an expanding apparatus precedes a pellet press, which caused additional energy and investment costs.

It is an object of the invention to provide a device of the kind described in such a way that the material coming out of the discharge opening selectively has a desired shape (so-called crumbs or pellets).

SUMMARY OF THE INVENTION

This aim is achieved according to the invention by exchangeably mounting the teeth that are situated on the counter-pressure member for forming strand pieces of predetermined length, in order to form material of a desired shape.

In the construction provided by the invention the teeth of the counter-pressure member may be omitted, if desired, so that the apparatus becomes more versatile in use. On the other hand, it is easy to change worn-out teeth without having to replace the whole counter-pressure member which may have a considerable diameter and weight. When shaped material is manufactured, the selective use of a cutting member makes it possible to avoid the unwanted discharging of the material in long billets whereby these billets break off in irregular shapes and thus lose the shape which they had before. The shaped material coming out of the discharge channels of an apparatus provided by the invention surprisingly has a high compactness with a very high stability of shape.

By providing a force of appropriate magnitude which acts on the counter-pressure member, the discharged shaped product is improved and, additionally, the performance in service of the apparatus is more satisfactory at the start since the counterpressure does not steadily increase but remains limited. Thereby it may be advantageous to provide an adjusting means for the force in order to adjust the counterpressure at the start of the apparatus at a lower level than later on. It must particularly be emphasized that with the apparatus provided by the invention the throughput rate of the apparatus is easily adaptable to conditions without any changes of the pressure conditions.

It is convenient to round the corners of the discharge channels to reduce the danger of the edges breaking off. Furthermore, the pressure is suitably raised by use of a decreasing cross section of the discharge channels, for which reason the entrance of a discharge channel may be enlarged, e.g. by a pocket-like recess located in the housing side.

BRIEF DESCRIPTION OF THE DRAWINGS

Other characteristics of the invention will result from the description of embodiments schematically shown in the drawings, in which.

DETAILED DESCRIPTION OF THE DRAWINGS

Figure 1:
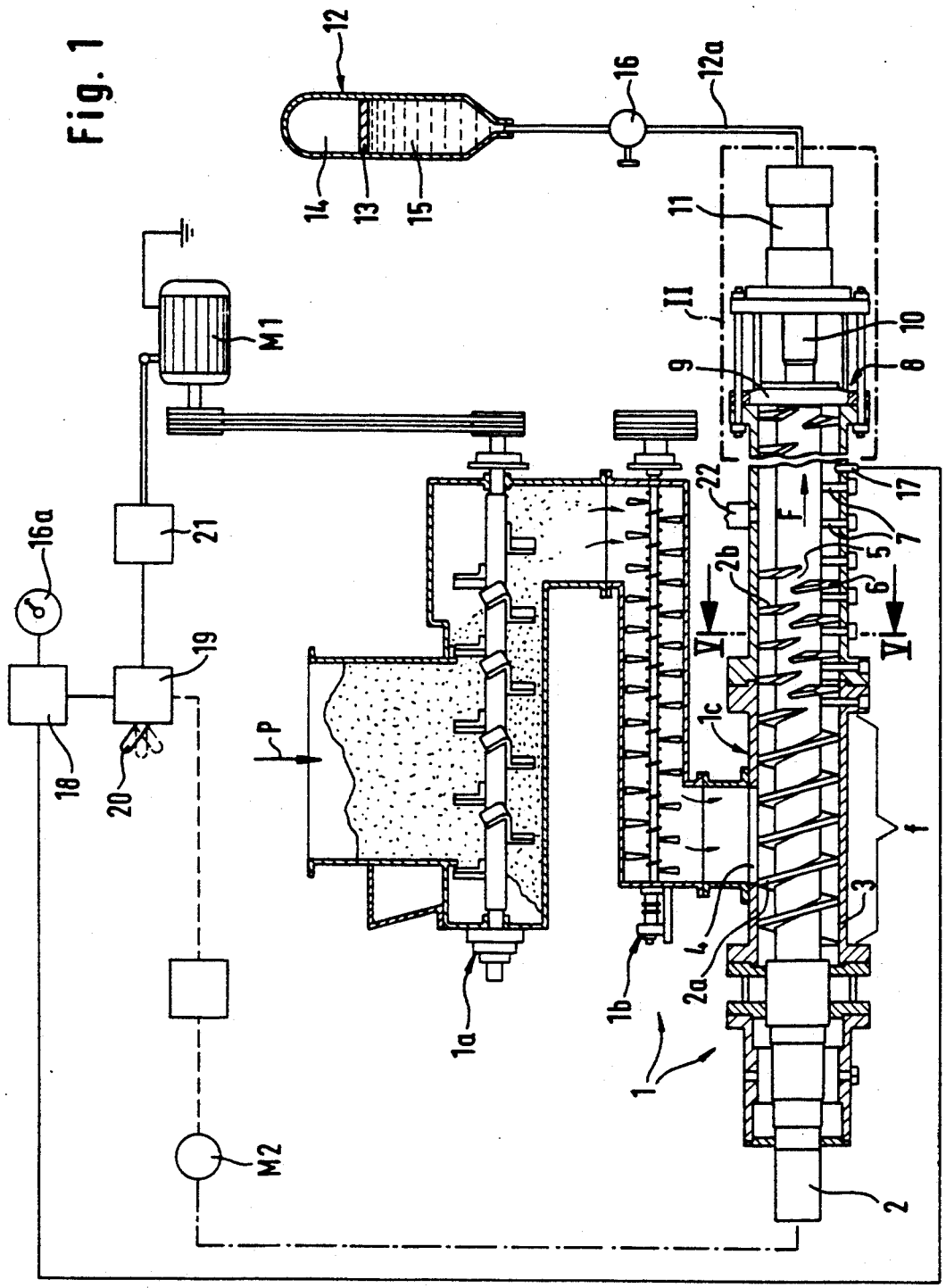
FIG. 1 is a schematic representation of an apparatus provided by the invention for forming shaped material, FIG. 2 an enlarged representation of detail II in FIG. 1 in a broken-out section, FIG. 3 an enlarged representation of a sectional view through an annular discharge opening equipped with teeth, FIG. 4 a sectional view on the line IV—IV in FIG. 2, FIG. 5 a sectional view on the line V—V in FIG. 1, FIG. 6 a plan view of an annular discharge opening equipped with teeth in the direction of the arrow VI in FIG. 3 in a modified design, and FIG. 7 a sectional view on the line VII—VII in FIG. 6.

The apparatus in FIG. 1 is "folded" to achieve a foreshortening of the axial length, i.e. divided into a plurality of axial housing portions located next to one another; in principle an arrangement on one axis with only one screw shaft is also possible. Due to the division into axial housing portions each screw shaft arranged in a housing portion can conveniently be driven at an individual speed. The first housing portion 1a functions as a proportioning and mixing means; the raw material is supplied to it in the direction of arrow P. In the second housing portion 1b the further intermixing takes place, if necessary with a supply of steam and/or liquids. In the last housing portion there is a screw shaft 2 designed as a screw conveyor 2a in the area of an entrance opening 4 in a conveying section f and provided with kneading tools 6 in section 2b which follows in conveying direction F. The kneading tools 6 are made of screw sections running over a circumferential section of the screw shaft 2 between which openings 5 are designed.

Figure 5:
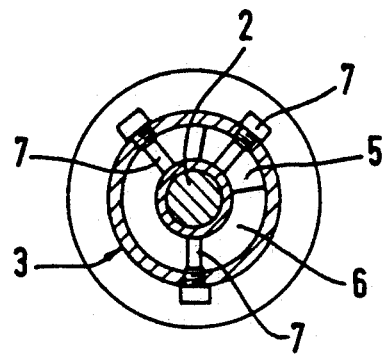

Stationary kneading tools 7 (FIGS. 1, 5) work together with the kneading tools 6 of the screw shaft 2. The material pushed forward in housing 3 of housing portion 1c passes round the kneading tools designed as pins 7 via the openings 5, for which reason a good intermixing can be achieved. Other kneading tools such as eccentric disks or the like are suitably used as kneading means as well.

After an intense kneading of the raw material, for instance an animal feed mixture or soya beans material, by the kneading tools 6 and 7, it is carried to a discharge opening 8 at the frontal end surface. The discharge opening 8 is limited by the frontal end of housing 3 and an axial, substantially conical counter-pressure member 9. In housing 3 one or several steam inlet openings 22 may be provided in the kneading section or steam can be furnished over a hollow screw shaft.

Figure 2:
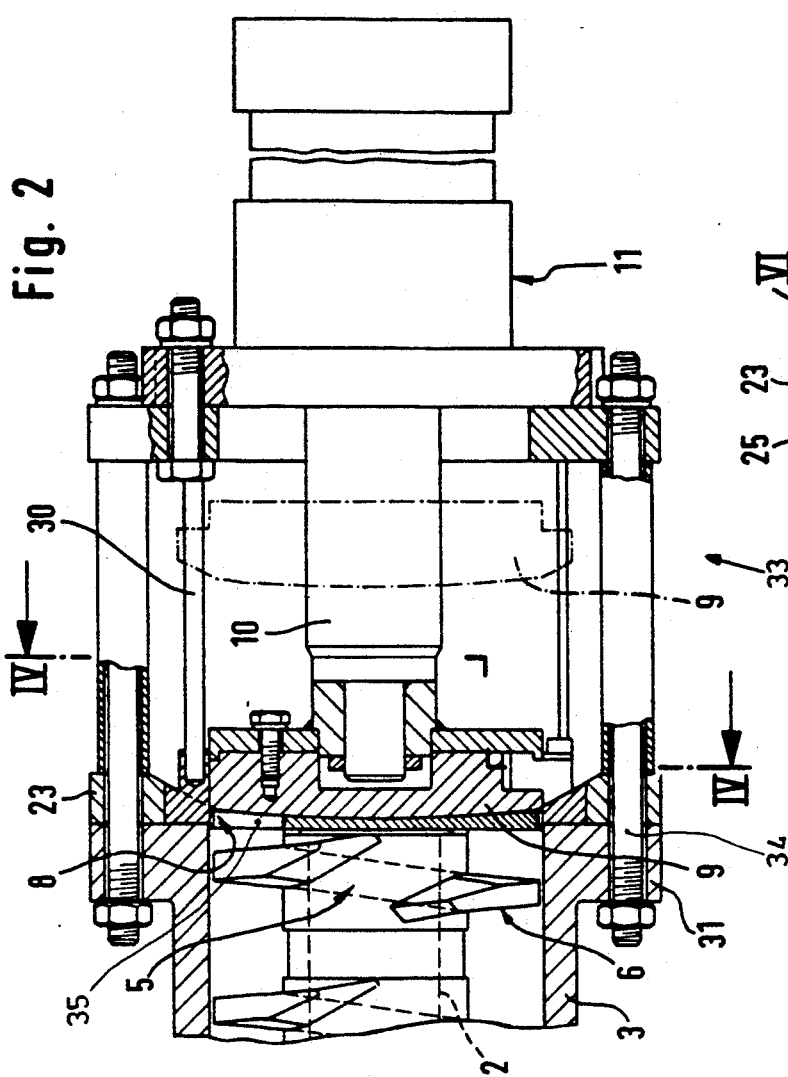

As is particularly shown in FIG. 2, the counter-pressure member 9 is connected to the free end of a piston rod 10 of a piston-and-cylinder unit 11. As shown in FIG. 1, the piston-and-cylinder unit 11 is connected to a pressure storing unit 12 over which the working area of the piston-and-cylinder unit is supplied with a uniform force acting on the counter-pressure member 9 via the piston rod 10. As is well known, the pressure storing unit 12 is composed of a gas volume 14, acting on a diaphragm or a piston 13, whose pressure biases a hydraulic liquid 15. The pressure acts via the connector line 12a in the working area of the piston-and-cylinder unit 11. An adjustable reducing valve 16 is conveniently arranged in the connector line 12a so that the force acting on the counter-pressure member 9 is held adjustable. This arrangement may appropriately be connected to a housing flange 31 as a detachable unit by means of screws 34.

Thus, the pressure of the raw material, which is carried over the screw conveyor 2a in the direction F, is counterbalanced by a uniform adjustable counterpressure of the same magnitude. This makes it possible to adjust the counterpressure to the various materials or mixtures as well as to different operating conditions of the apparatus 1 such as variant throughput rates, start or full-load operation.

In a simple—not represented—embodiment, a pivotable lever loaded by a weight may also be provided for supplying the force acting on the counter-pressure member 9. One end of the lever carries a weight by way of example whereas the other end situated on the other side of the swivelling axis acts on the counter-pressure member.

The screw shafts of the housing portions 1a to 1c of the apparatus 1 can operate without being adjusted. If, however, fluctuations in the rotating speed of the shafts and/or fluctuations in the raw material supplied should occur, the pressure of the material in the housing 3 increases, for which reason the discharge opening 8 will correspondingly expand to reduce the pressure of the material. Thus, the product discharged will have a fluctuating profile. In order to get shaped material of a particularly uniform profile at the discharge opening 8, a control circuit means is suitably provided. For this, a pressure sensor 17 is designed before the discharge opening 8 of the housing 3, the output signal of which is then evaluated in a control circuit unit 18. The control circuit unit 18 receives signals representing a desired pressure by a set-point adjuster which thus regulates the pressure in the housing. The valve 16 adjusting the counterpressure in the piston-and-cylinder unit is suitably connected to the set-point adjuster in such a manner that corresponding pressure values can be attained, if necessary.

A selector stage 19 may advantageously be designed at the output of the selector lever 20 which enables a further switching over. At the position of the selector lever—as shown in the drawing with full lines—a final control element 21 is selected for controlling the rotational speed of the motor M1. This adjustment is preferred since the motor M1 of the screw shaft in the housing portion 1a (dosaging shaft) will generally be designed as a smaller unit than motor M2 driving the screw shaft 2 of the housing portion 1c and since it is often desirable to drive the screw shaft 2 with a fixed, constant throughput volume and, therefore, not to change its number of revolutions. At medium position of the selector lever 20, depicted with broken lines in the drawing, a sort of cascade control is attained whereby the motor M1 is first adjusted and an adjustment of motor M2 takes place only if the range of control for motor M1 is not sufficient. Furthermore, by switching the selector lever 20 over into the lower position shown in broken lines, an exclusive adjustment of motor M2 for the screw shaft 2 becomes possible.

Due to the constant pressure acting on the counter-pressure member 9 the shaped material coming out at the discharge opening 8 has a high compactness and a good stability of shape. Therefore, it is possible to dispense with an application of a postponed pelleting machine; if the shaped material is nevertheless subjected to further treatment, the obtained final product will be of a still higher quality.

In accordance with the invention, it is provided to design the discharge opening 8 not as an annular opening but to divide it into several circumferentially arranged discharge channels 8a located next to one another. For this a retaining ring 23 is to be fastened with screws to a flange 31 of the frontal end surface (FIG. 2), thereby holding on the inside an annular wear-member 25 (FIGS. 3, 4) which has toothlike projections 24 extending parallely to screw shaft 2 in axial direction. To enable a replacement of the projections 24 susceptible to wear, the wear-member 25 is exchangeably mounted in the retaining ring 23.

Teeth 26 of the counter-pressure member 9 reach into the toothlike projections 24 whereby a plurality of discharge channels 8a are circumferentially arranged around the counter-pressure member 9, the discharge channels being defined by the annular wear-member 25, its toothlike projections 24, the teeth and the edge of the counter-pressure member 9.

Figure 6:
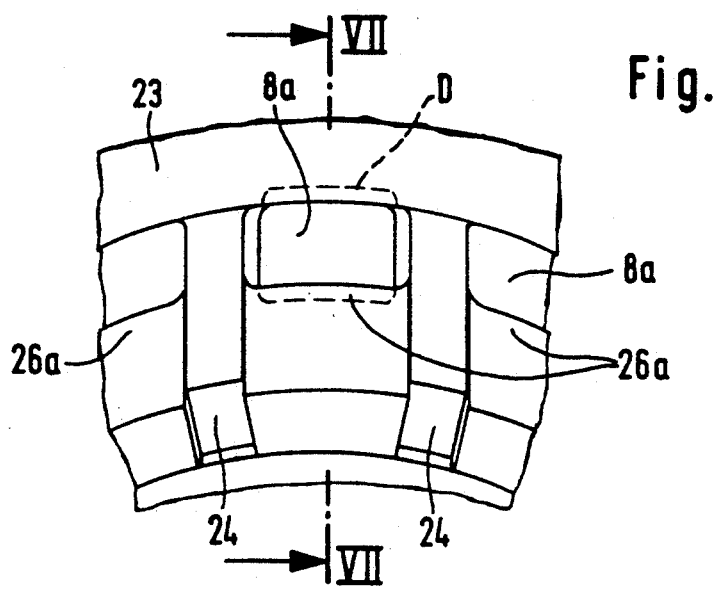
Figure 7:
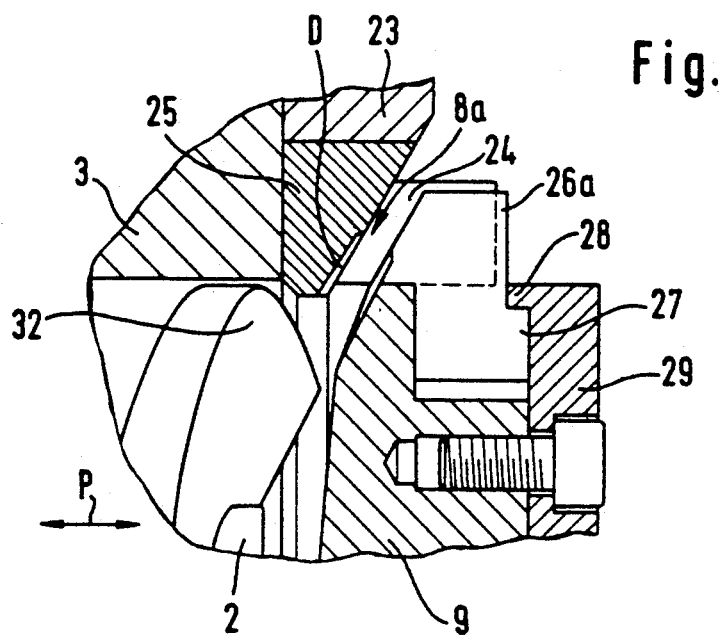

Since the teeth 26 are also subjected to increased wear by the material discharged and for enabling their removal, they are exchangeably mounted. For this, each tooth 26 or 26a (FIG. 6, 7) is provided with a retaining projection 27 which—together with a corresponding projection 28 of a retaining plate 29 screwed on to the counter-pressure member—keep the teeth 26 or 26a in their position.

Thus, it becomes easily possible to completely dispense with the teeth 26a for operation as a traditional expander. However, it is also possible to replace particular worn-out teeth 26a without any difficulty.

The intermeshing teeth also function as a protection against torsion for the counter-pressure member 9 over the axial length of the projections 24. If the counter-pressure member is lifted off from the housing 3 to be cleaned, as depicted in FIG. 2 with broken lines, guiding colums are advantageous.

Due to the division of the annular discharge opening into a plurality of discharge channels 8a, it is possible to model the material discharged or the shaped material which always has a uniform compactness owing to the constant counterpressure. To cut off the shaped material discharged from the channels 8a in the form of pellets, it would be possible, if necessary, to dispense with the columns 30 to arrange a cutting member operating all around the piston rod 10. The projections 24, by way of example, may then be extended for the guidance of the counter-pressure member. However, the embodiment herein described is more suitable, operating with a cutting member 35 arranged before the counter-pressure member 9 and driven by the screw shaft 2, said cruciform or star-shaped cutting member having clearances between its radial arms. If desired, the cutting member 35 can be taken off, in which case the expander may then be operated in the traditional way. To this end, the screw shaft may be provided with an appropriate seating surface (not shown) for the cutting member.

Figure 3:
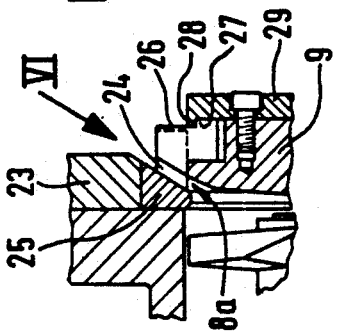
Figure 4:
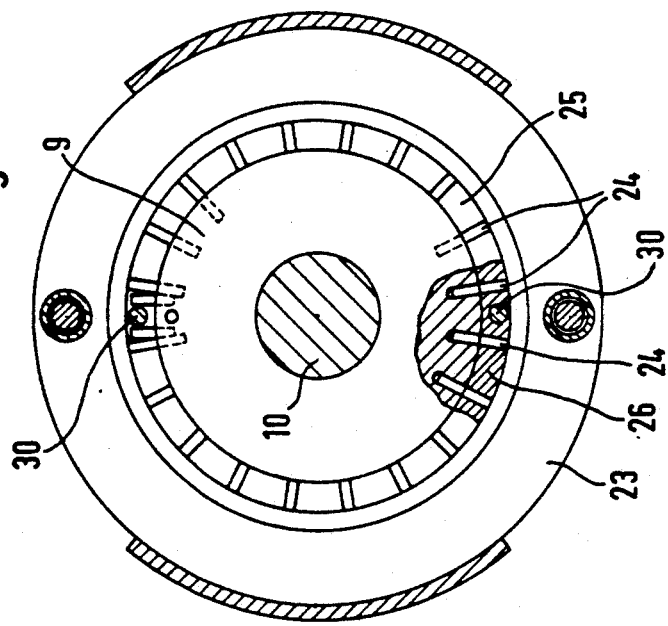

If using a toothing according to FIGS. 2 and 3, quadriform or rectangular (in sectional view) shaped material or pellets are obtained, the edges of which are exposed to an increased danger of breaking off, which, however, is always of minor importance if the shaped material is afterwards subjected to further treatment. In the case of a further treatment of the shaped material, for instance in a pelleting machine, the contraction of volume and high compactness attained by the pressing out of the raw material from the channels is also advantageous.

If the shaped material constitutes the end product after being discharged from the channels 8a, the clearances between the toothlike projections 24 and preferably also the teeth 26a located opposite these are designed concave-shaped at their peripheries to reduce the danger of the edges breaking off. Thus, all the corners of the channel 8a are rounded. To achieve a still higher compactness of material, it may be advantageous to diminish the throughput cross section of a channel 8a towards the outlet; at its end, facing the screw shaft, the channel 8a is designed with an enlarged cross section, which is effected by corresponding pocket-like recesses D (FIG. 6, 7) in the wear-member 25 and/or in the counter-pressure member 9.

A smearing member 32 may suitably be provided at that end of the screw shaft 2 facing the counter-pressure member, said smearing member 32 pressing the raw material into the channels 8a by force. For this, the distance of the smearing member 32 to the discharge openings of the channels 8a is conveniently held adjustable, for which reason the screw shaft 2 is constructed as a unit movable in the direction of arrow P. The adjustment takes place by means of an adjusting device already known as such.

To achieve a uniform pressure of the material in the area of the counter-pressure member 9, it may be suitable to design a compression zone just before the discharge opening, which is made possible by a contracted throughput cross section between screw shaft 2 and the housing 3 and/or by contracted screw spirals. It would also be advantageous to arrange—in addition or alternatively—a short conveying portion (similar to conveying portion f) after the kneading tools 6 and 7.

What is claimed is:

1. Apparatus for forming shaped material from a raw material, comprising
    housing means defining a substantially cylindrical inner space for conveyance of said raw material in a conveying direction;
    at least one screw shaft rotatably mounted within said inner space;
    drive means for operating said screw shaft;
    wherein said housing and said screw shaft exert pressure on said raw material within said inner space;
    said apparatus further comprises counter-pressure means disposed on a downstream end of said housing and serving as a frontal end surface of the housing;
    a discharge opening located at said counter-pressure means and communicating with said inner space;
    tooth means surrounding said discharge opening and including a first row of teeth connected to said housing means, said tooth means further comprising a second row of teeth located at said discharge opening and connected to said counter-pressure means; and
    tooth retention means for securing teeth of said second row of teeth to said counter-pressure means and allowing replacement of teeth of said second row of teeth, said first and second rows of teeth intermeshing with each other to divide the discharge opening into a plurality of discharge channels for exit of said raw material from said inner space;
    wherein said tooth retention means comprises retaining projections disposed on said second row of teeth, and said tooth retention means comprises a plate mounted on said counter-pressure means; and
    the retaining projections of the teeth of said second row of teeth extend from regions of the respective teeth facing away from the first row of teeth and extend between said counter-pressure means and said plate to be secured to said counter-pressure means by said plate, a releasing of said plate from said counter-pressure means serving to release the teeth of said second row of teeth.

2. Apparatus as claimed in claim 1, further comprising
    an annular wear-member connected to a downstream end of said housing means and facing said counter-pressure means;
    wherein said tooth means, at least in part, are arranged on said annular wear-member to extend in parallel with said screw shaft, the tooth means forming axial projections of said wear-member.

3. Apparatus as claimed in claim 2, wherein said wear-member is exchangeably mounted on said housing means.

4. Apparatus as claimed in claim 1 wherein a cross-section of each of said discharge channels has rounded edges.

5. Apparatus as claimed in claim 2, wherein
    each of said discharge channels has an entrance at an upstream end of the channel and a discharge end at a downstream end of the channel; and
    said discharge channels have a cross-section smaller at the discharge end than at the entrance.

6. Apparatus as claimed in claim 5, wherein
    said discharge channels comprise at least one pocket-like recess at an entrance to a discharge channel.

7. Apparatus as claimed in claim 6, wherein
    said recess is located on said annular wear-member.

8. Apparatus as claimed in claim 7, wherein
    said recess is located on said counter-pressure means.

9. Apparatus as claimed in claim 1, further comprising
    urging means exerting a force against said counter-pressure means for biasing said counter-pressure means against said pressure.

10. Apparatus as claimed in claim 9, further comprising
    adjusting means for setting said force.

11. Apparatus as claimed in claim 9, wherein said urging means comprise a piston-and-cylinder-unit.

12. Apparatus as claimed in claim 11, wherein
    said counter-pressure means are connected to the piston of said unit.

13. Apparatus as claimed in claim 11, wherein said urging means comprise pressure storing means connected to said unit.

14. Apparatus as claimed in claim 13, wherein said adjusting means includes valve means connected between said unit and said pressure storing means.

15. Apparatus as claimed in claim 9, wherein said urging means comprise a source of hydraulic medium.

16. Apparatus as claimed in claim 1, wherein
said frontal end surface of said counter-pressure means is convex.

17. Apparatus as claimed in claim 16, wherein
said frontal end surface of said counter-pressure means has the form of a frustoconical surface.

18. Apparatus as claimed in claim 1, further comprising
pressure sensing means located at said discharge opening and providing an actual pressure signal representing a magnitude of said pressure within said inner space;
means providing a signal representing a desired pressure for said inner space; and
control circuit means for comparing said actual and said desired pressure signal, and for applying a control signal to said drive means for controlling rotational speed of said screw shaft.

19. Apparatus as claimed in claim 1, further comprising smearing means situated on said screw shaft to supply material into said discharge opening.

20. Apparatus as claimed in claim 1, wherein
said screw shaft is shiftably mounted in axial direction.

21. Apparatus for forming shaped material from a raw material, comprising
housing means defining a substantially cylindrical inner space for conveyance of said raw material in a conveying direction;
at least one screw shaft rotatably mounted within said inner space;
drive means for operating said screw shaft;
wherein said housing and said screw shaft exert pressure on said raw material within said inner space;
said apparatus further comprises counter-pressure means disposed on a downstream end of said housing and serving as a frontal end surface on the housing;
a discharge opening located at said counter-pressure means and communicating with said inner space; and
tooth means surrounding said discharge opening and including a first row of teeth connected to said housing means, said tooth means further comprising a second row of teeth connected to said counter-pressure means;
wherein said first and second rows of teeth mesh with each other to divide the discharge opening into a plurality of discharge channels for exit of raw material from said inner space;
said apparatus further comprises rotatable cutting means disposed at said discharge openings; and
tooth retention means for securing teeth of said second row of teeth to said counter-pressure means;
wherein said tooth retention means comprises retaining projections disposed on said second row of teeth, and said tooth retention means comprises a plate mounted on said counter-pressure means; and
the retaining projections of the teeth of said second row of teeth extend from regions of the respective teeth facing away from the first row of teeth and extend between said counter-pressure means and said plate to be secured to said counter-pressure means by said plate, a releasing of said plate from said counter-pressure means serving to release the teeth of said second row of teeth.

22. Apparatus as claimed in claim 21, wherein said cutting means are arranged between said screw shaft and said counter-pressure means and are in driving connection with said screw shaft.

23. Apparatus as claimed in claim 21, wherein said cutting means are removably arranged.

24. Apparatus as claimed in claim 21, further comprising
kneading tools situated adjacent to said counter-pressure means.

25. Apparatus as claimed in claim 24, wherein said kneading tools project from said screw shaft.

26. Apparatus as claimed in claim 24, wherein said kneading tools project from said housing means into said inner space.

27. Apparatus as claimed in claim 24, wherein said kneading tools project from said screw shaft as well as from said housing means into said inner space, the tools of said screw shaft and the tools of said housing means intermeshing with each other.

28. Apparatus for forming shaped material from a raw material, comprising
housing means defining a substantially cylindrical inner space for conveyance of said raw material in a conveying direction;
at least one screw shaft rotatably mounted within said inner space;
drive means for operating said screw shaft;
wherein said housing and said screw shaft exert pressure on said raw material within said inner space;
said apparatus further comprises counter-pressure means disposed on a downstream end of said housing and serving as a frontal end surface of the housing;
a discharge opening located at said counter-pressure means and communicating with said inner space;
tooth means surrounding said discharge opening and including a first row of teeth connected to said housing means, said tooth means further comprising a second row of teeth located at said discharge opening and connected to said counter-pressure means; and
tooth retention means for releasably connecting individually the teeth of said second row of teeth to said counter-pressure means and allowing replacement of individual ones of the teeth of said second row of teeth, said first and second rows of teeth intermeshing with each other to divide the discharge opening into a plurality of discharge channels for exit of said raw material from said inner space;
wherein said retention means includes an element displaceable relative to teeth of said second row of teeth and relative to said counter-pressure means for urging the teeth of said second row of teeth into their respective locations on said counter-pressure means; and
said displaceable element and said counter pressure means define a mating surface for engagement with teeth of said second row of teeth, and each tooth of said second row of teeth has a region, opposite said first row of teeth, for entering into locking engagement with said mating surface.

29. Apparatus for forming shaped material from a raw material, comprising housing means defining a substantially cylindrical inner space for conveyance of said raw material in a conveying direction;

at least one screw shaft rotatably mounted within said inner space;

drive means for operating said screw shaft;

wherein said housing and said screw shaft exert pressure on said raw material within said inner space;

said apparatus further comprises counter-pressure means disposed on a downstream end of said housing and serving as a frontal end surface of the housing;

a discharge opening located at said counter-pressure means and communicating with said inner space; and tooth means surrounding said discharge opening and including a first row of teeth connected to said housing means, said tooth means further comprising a second row of teeth connected to said counter-pressure means;

wherein said first and second rows of teeth mesh with each other to divide the discharge opening into a plurality of discharge channels for exit of raw material from said inner space;

said apparatus further comprises rotatable cutting means disposed at said discharge opening; and tooth retention means for releasably connecting individually the teeth of said second row of teeth to said counter-pressure means;

wherein said retention means includes an element displaceable relative to teeth of said second row of teeth and relative to said counter-pressure means for urging the teeth of said second row of teeth into their respective locations on said counter-pressure means; and said displaceable element and said counter pressure means define a mating surface for engagement with teeth of said second row of teeth, and each tooth of said second row of teeth has a region, opposite said first row of teeth, for entering into locking engagement with said mating surface.

30. Apparatus according to claim 28, wherein said displaceable element is configured as a plate.

31. Apparatus according to claim 28, wherein said mating surface extends in directions both perpendicular and parallel to an axis of said counter-pressure means.

32. Apparatus according to claim 31, wherein said retention means includes lip means engaging with teeth of said second row of teeth.

33. Apparatus according to claim 32, wherein said lip means is carried by said displaceable element of said retention means.

34. Apparatus according to claim 33, wherein said mating surface comprises a surface of said displaceable element and a surface of said lip means.

35. Apparatus according to claim 32, wherein said lip means envelopes a portion of each tooth of said second row of teeth.

36. Apparatus according to claim 29, wherein said displaceable element is configured as a plate.

37. Apparatus according to claim 29, wherein said mating surface extends in directions both perpendicular and parallel to an axis of said counter-pressure means.

38. Apparatus according to claim 37, wherein said retention means includes lip means engaging with teeth of said second row of teeth.

39. Apparatus according to claim 38, wherein said lip means is carried by said displaceable element of said retention means.

40. Apparatus according to claim 39, wherein said mating surface comprises a surface of said displaceable element and a surface of said lip means.

41. Apparatus according to claim 38, wherein said lip means envelopes a portion of each tooth of said second row of teeth.

42. Apparatus for forming shaped material from raw material, comprising:

housing means encircling a path for conveyance of said raw material in a conveying direction;

counter-pressure means having a discharge opening and being disposed on a downstream end of said housing;

means for urging the raw material along said path and against said counter-pressure means;

a plurality of teeth extending into said discharge opening to configure said discharge opening; and tooth retaining means engageable with said counter-pressure means for securing the teeth to the counter-pressure means, said retaining means contacting each of said teeth at a portion of the tooth facing away from said discharge opening, said tooth portion and said counter-pressure means and said retaining means defining an interfacing surface between said tooth portion and said counterpressure means and said retaining means, said interfacing surface being configured for locking each of said teeth in a desired position upon advancement of said retaining means to said counter-pressure means.

43. Apparatus according to claim 42, wherein said teeth are arranged in a row around a perimeter of said discharge opening, there being an array of teeth extending into said discharge opening from said housing means and meshing with said row of teeth to configure said discharge opening.

* * * * *